July 10, 1956 C. MALLOW 2,753,912
NON-SKID TIRE COVER
Filed March 9, 1954 4 Sheets-Sheet 1

CHARLES MALLOW
INVENTOR.

BY
ATTORNEY

July 10, 1956
C. MALLOW
2,753,912
NON-SKID TIRE COVER
Filed March 9, 1954
4 Sheets-Sheet 2
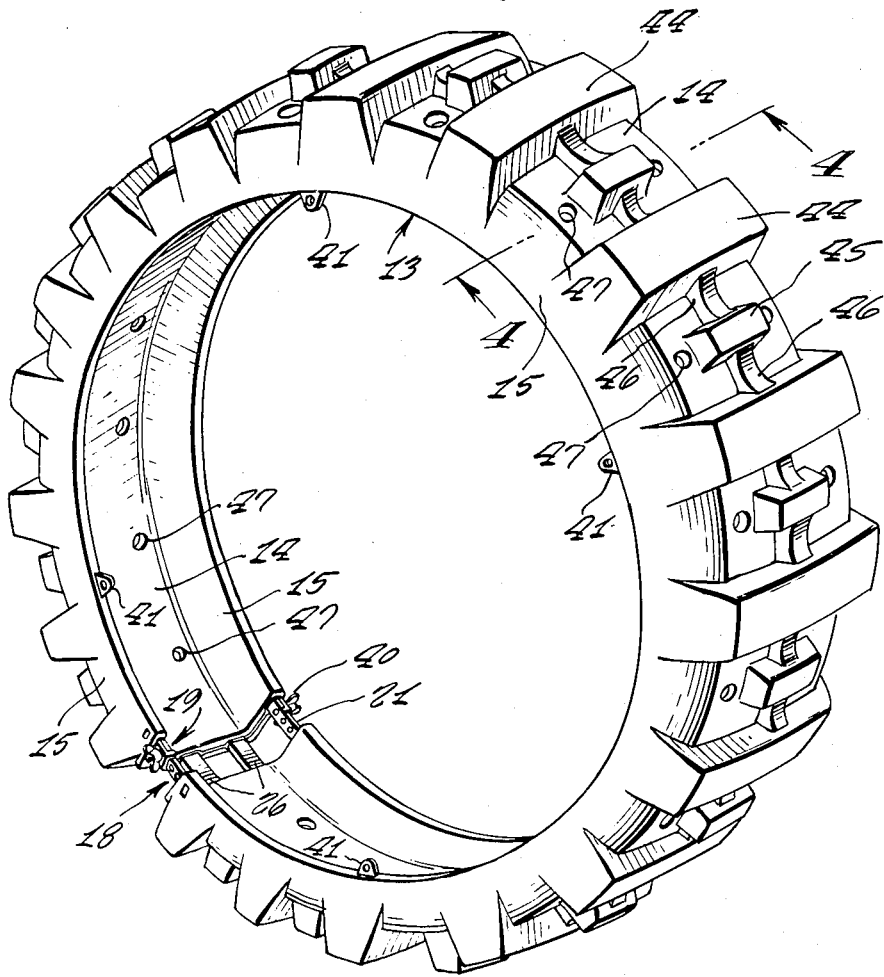
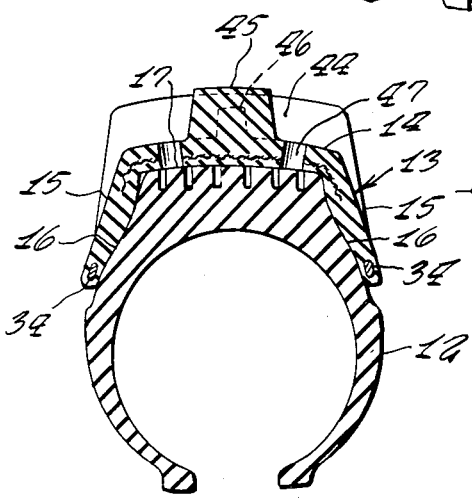
CHARLES MALLOW
INVENTOR.
BY
ATTORNEY

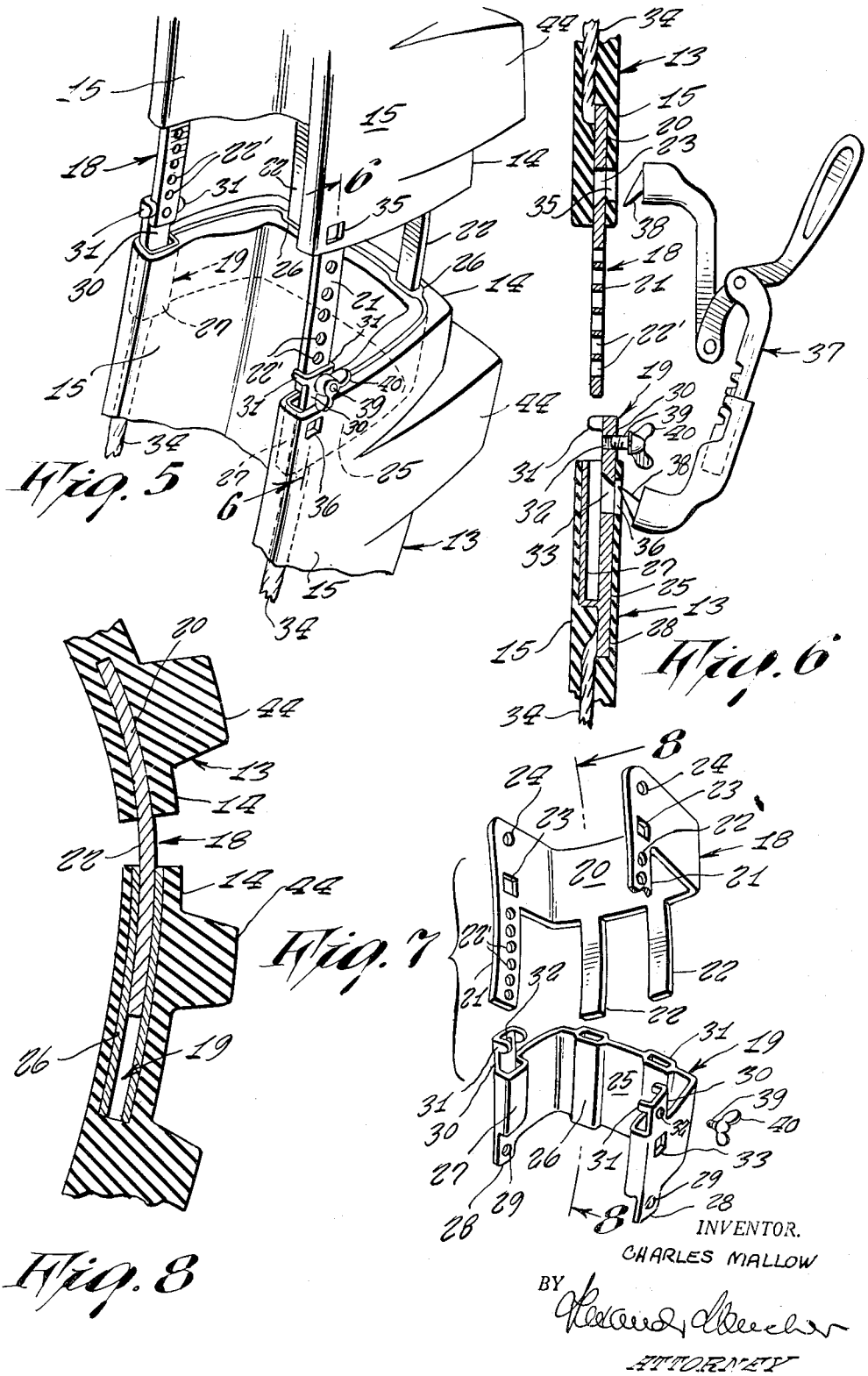

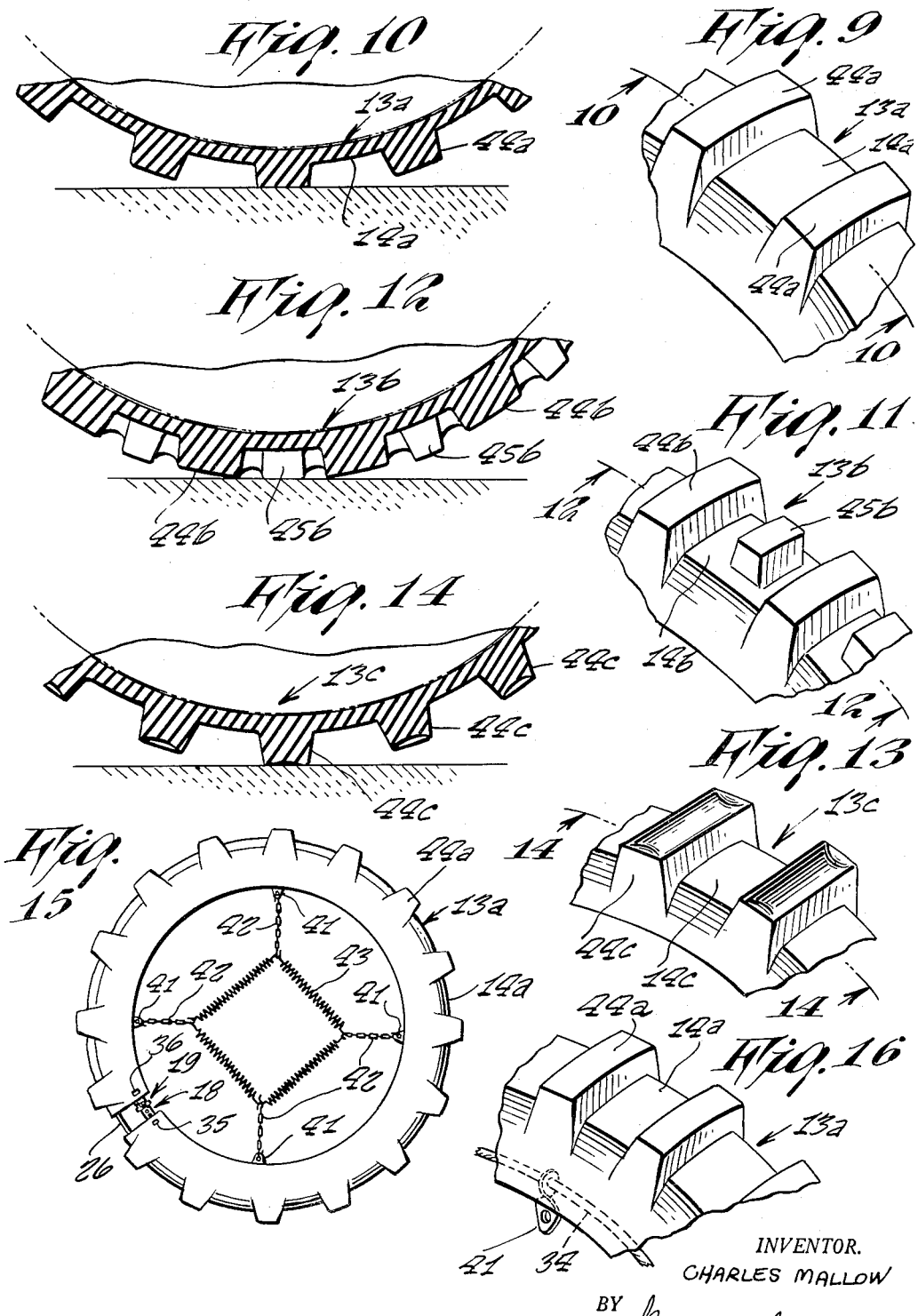

United States Patent Office 2,753,912
Patented July 10, 1956

2,753,912

NON-SKID TIRE COVER

Charles Mallow, Valley Stream, N. Y.

Application March 9, 1954, Serial No. 414,974

7 Claims. (Cl. 152—175)

This invention relates generally to antiskid means for automobile tires, but more specifically to a removable tire covering for this purpose overcoming drawbacks inherent in prior devices.

In order to prevent slippage of automobile tires on snow and ice during winter driving, metallic skid chains of known construction have been and are commonly employed. However, in addition to being difficult to mount upon the tire, metallic chains suffer from several serious disadvantages. For example, when the wheels of a vehicle pass over a portion of the road where the snow or ice has melted, the chains come into direct contact with the relatively hard surface of the road, causing the chains to dig into the tires shortening thereby the life thereof. Furthermore, loose chains during revolution of the wheels impinge on the fenders and surrounding portions of the car in a destructive manner.

It is accordingly a principal object of the present invention to provide anti-skid means for tires wherein relative wear between the tire and the anti-skid means is eliminated, and wherein common general disadvantages of metallic skid chains are eliminated.

It is another object of the present invention to provide anti-skid means for rubber tires which is of the same material as the tire itself thereby eliminating both relative wear and slippage therebetween.

It is another object of the present invention to provide anti-skid means for automobile tires which are pleasing and attractive in appearance as compared with unsightly skid chains and which do not perceptibly affect the regular or normal appearance of the tires and which are substantially silent in operation.

It is still another object of the present invention to provide anti-skid means for automobile tires which are easily and readily mounted on the tires and which are adjustable so that tires of varying sizes due to wear and tear and small variations in tire sizes may be accommodated.

It is still another object of the present invention to provide anti-skid means for tires having superior traction qualities as compared with skid chains.

It is still another object of the present invention to provide anti-skid means for automobile tires of superior traction properties wherein the effects of both suction and friction are employed.

Other objects of the present invention are to provide anti-skid means for tires bearing the above objects in mind which is of simple construction, inexpensive to manufacture, has a minimum number of parts, is easy to apply and remove and which is efficient and durable in operation.

For other objects and a better understanding of the invention, reference may be had to the following detailed description taken in connection with the accompanying drawings in which:

Figure 3 is a perspective view of the anti-skid means embodying the features of the present invention and shown alone;

Figure 4 is a transverse sectional view taken along the line 4—4 of Figure 3 and showing the invention in operative position upon a tire;

Figure 5 is an enlarged fragmentary perspective view of the invention showing the manner in which the device is adjustably secured on the tire;

Figure 6 is a longitudinal sectional view taken along the line 6—6 of Figure 5 and showing a type of tool that can be used with the present invention;

Figure 7 is an exploded view of the adjustable locking members, shown alone;

Figure 8 is a longitudinal sectional view taken along the line 8—8 of Figure 7 and showing the locking members mounted within the device;

Figure 9 is a fragmentary perspective view of a modified form of the present invention;

Figure 10 is a longitudinal sectional view taken along the line 10—10 of Figure 9 and showing the manner in which the device engages the snow or ice-covered road;

Figure 11 is a fragmentary perspective view of a still further modified form of the present invention;

Figure 12 is a longitudinal sectional view taken along the line 12—12 of Figure 11 and showing the manner in which the device engages the snow or ice-covered surface to prevent slippage;

Figure 13 is a fragmentary perspective view of a still further modified form of the present invention;

Figure 14 is a longitudinal sectional view taken along the line 14—14 of Figure 13 and showing the manner in which the device engages the snow or ice-covered surface;

Figure 15 is a side elevational view showing an optional means for further securing the devices shown in Figures 1–14 on to the tire, and Figure 16 is a fragmentary perspective view showing the manner in which the mounting lugs are secured to the device.

Figures 1, 2:
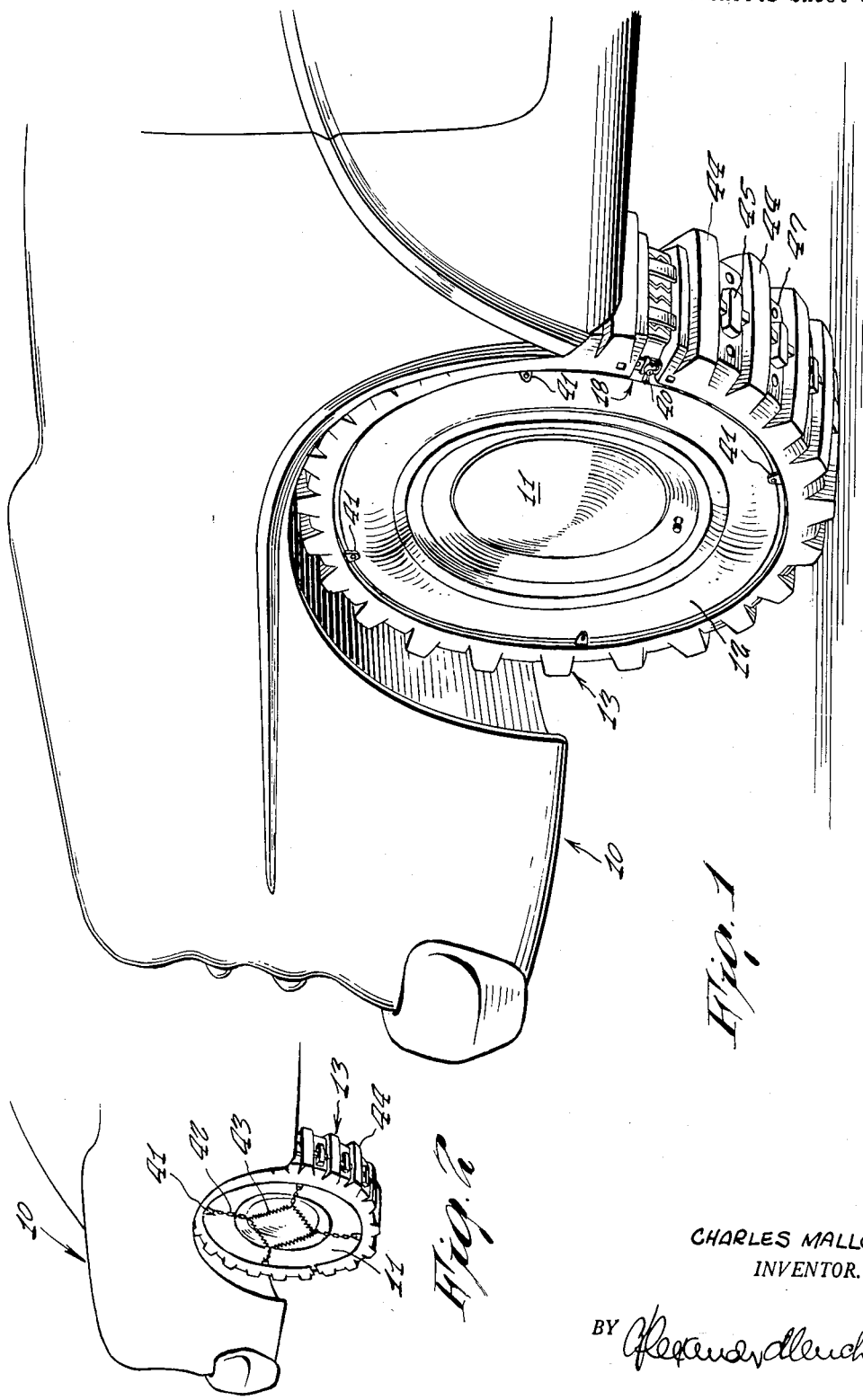
Figure 1 is a perspective view of an automobile or vehicle wheel showing the invention incorporated thereon.
Figure 2 is a view similar to Figure 1 but showing an optional form of further securing the anti-skid means upon the tire.

Referring now more in detail to the drawings, wherein similar reference characters identify corresponding parts throughout the several views, there is shown in Figures 1 and 2 a vehicle such as an automobile or car 10 having the usual tire covered wheels 11, substantially as illustrated.

In the practice of my invention, improved anti-skid means are provided for the rubber tires indicated generally 12 and includes an annular or circular cover 13 of rubber or other similar material, and being substantially U-shaped in cross-section and being adapted to fit snugly around the outside of the tire (Figure 4).

Cover 12 is made up of a cylindrical back portion 14 integrally formed along each longitudinal edge with inwardly extending side walls 15 which embrace the sides 16 of the tire (Figure 4), the inner face of the back portion 14 lying flush with the treads 17 of the tire. Cover 13, it will be noted, is split to permit the same to be easily and readily mounted upon the tire or adjusted to different tires of slight varying sizes due to the type or wear and tear as will hereinafter become clear.

Since the back 14 and the side walls 15 of the cover are formed of the same material as the tire 12, it will be apparent that a relatively high coefficient of friction will be established therebetween, thereby preventing relative slippage.

As a means of securing the cover 13 about the tire 12, a pair of complementary locking members 18 and 19 (Figure 7) of substantially U-shaped cross-section are provided. Thus, bracket 18 comprises a three sided base portion 20 integrally formed along one edge with the outer fingers 21 and the inner fingers 22, the outer fingers 21 being provided with a plurality of longitudinally spaced openings 22' for a purpose which will hereinafter become clear. The base portion 20 is also provided with a pair of angular openings 23 and circular openings 24.

The bracket 19 comprises a three sided base portion 25 integrally formed and has a central section with spaced sleeves 26 adapted to receive therewithin the fingers 22, the base 25 at each outer end being also integrally formed with sleeves 27 adapted to receive therewithin the fingers 21. The base portion 25 adjacent one end of the sleeves 27 is integrally formed with ears 28 having aligned openings 29, the base 25 and the other end of the sleeves 27 being integrally formed with extensions 30 provided with guide lugs 31 (Figure 5). The extensions 30 are each provided with an opening 32 adapted to be aligned with a selected one of the openings 22'.

The end portions of the base 25 are provided with the angular openings 33 which cooperate with the openings 23 of bracket 18 in a manner to be hereinafter made clear.

Referring to the cover 13, one end may be provided with a three sided narrow opening adapted to receive therewithin the base portion 20 of bracket 18. A pair of circular cables 34 are formed within the sides 15 of cover 13, the cable 34 at one end being secured within the openings 24 whereby to secure the bracket 18 to the cover (Figure 6). The sides 15 are further each provided with angular openings 35 aligned with the openings 23 of bracket 18.

The other end of the cover 13 may similarly be provided with a narrow, three sided opening adapted to receive snugly therewithin the base 25 of bracket 19, the opening being enlarged appropriately to accommodate the sleeves 26 and 27 (Figure 5). The bracket 19 is secured within the cover by means of the other ends of the cable 34 which are secured within the openings 29 provided in the lugs 28. The sides 15 at the other ends are provided with angular openings 36 (corresponding with openings 35) aligned with the openings 33 of the base portion 25.

It is apparent that brackets 18 and 19 and cables 34 may be secured together and the cover material molded therearound.

To secure the cover about the tire, the fingers 21 and 22 which are concentric with the cover are positioned within the sleeves 26 and 27 also concentric for adjustment. A snap lever wrench 37 is provided for tightening the cover around the tire with the jaws 38 thereof passing through the openings 35, 36 and engaging the openings 23 and 33, as will be obvious. When the cover has been tightened to the necessary extent, the position of the fingers 21 relative to the sleeves 27 is locked by means of screws 39 screw threaded into the openings 32, screws 39 being provided with enlarged wing shaped heads 40 to facilitate tightening. To easily and readily remove the cover from the tire, it is only necessary to reverse the above operation. It will also be apparent that by selectively engaging the screws 39 with the openings 22', the cover is adjustable for tires of slightly varying sizes.

If desired, the cover may be additionally secured about the tire 12 by means of a plurality of perforated lugs 41 mounted upon the cables 34 and preferably applied before molding of the cover (Figure 16). The lugs 41 serve to receive and secure one of the ends of conventional chains 42 (Figures 2 and 15), the other ends of the chains 42 being centrally connected to the corners of a square shaped spring arrangement 43. The cover 13 may however be used without the chains 42 and spring 43, as shown in Figure 1.

As shown in Figure 3, the cover 13 along its outer surface or periphery is integrally formed with a plurality of transversely disposed and radially spaced treads 44.

The outer face of the back portion 14 intermediate the treads 44 is integrally formed with secondary treads 45, a reinforcing webbing 46 connecting the treads 45 with the back portion 14 and the treads 44. Adjacent each side of each of the secondary treads 45 are provided openings 47 which serve to permit the escape of any air which may be trapped between the cover and the tire thereby eliminating any unpleasant noises and swishing generated during movement of the vehicle.

In operation, each of the secondary treads 45 which are slightly higher than the treads 44 (Figure 4) will momentarily contact the ice (Figure 12) on a load carrying area and be compressed. The load lowers the melting point of the ice and causes the ice portion directly below a secondary tread 45 to melt. This melting action is the primary reason for slippage of conventional tires.

It will also be apparent that the adjacent lateral edges of the treads 44 on each side of the secondary treads 45 will dig into the ice to provide a friction effect to further prevent slippage.

Thus effect of friction is employed to provide improved anti-skid means having superior traction qualities. Furthermore, since the cover is the same material as the tire, there will be no relative wear when the device passes over a portion of the road where the snow and ice is melted. This common material will also prevent relative slippage between the cover and the tire, as will be obvious.

Referring now particularly to Figures 9 and 10, there is shown a modified form of the invention wherein a cover 13a is again provided with treads 44a. However, in this form the back portion 14a is devoid of the secondary treads 45, webbing 46 and openings 47 shown in the prior described first form of the invention.

Referring now particularly to Figures 11 and 12, there is shown another modified form of the device wherein the cover 13b is provided with the treads 44b and secondary treads 45b. However, the webbing 46 and the openings 47 of the first form are here eliminated. The traction principles of the form of the invention shown in Figures 11 and 12 are substantially the same as that of Figures 1–8.

Referring now particularly to Figures 13 and 14, there is shown a still further modified form of the present invention wherein the traction cover 13c is integrally formed with the treads 44c. However the treads 45, webbing 46 and openings 47 of the first form are absent and the contacting surfaces of the treads 44c are concave to provide suction action (Figure 14).

In other respects the modifications of Figures 10–14 are the same as the form of the invention as shown in Figures 1–8 as regards the manner of securing the covers about the tires.

Thus, there has been described an anti-skid device adapted for application to the rear wheels of a vehicle having pneumatic tires, which is easily applicable without the use of cumbersome tools, which when in use has the appearance of a superposed tread, causes a smooth ride without bumps, is not injurious to the tire and vehicle parts. For application, the vehicle may be jacked up or the wheel may be guided on one open end of the outstretched cover and rolled for complete engagement of the cover member.

I wish it understood that minor changes in size, integration, material, location and cooperation of parts may all be resorted to without departing from the spirit of the invention and the scope of the appended claims. It is also understood that the cover may be used for other road conditions requiring increased traction.

In addition, the cover member may be used for protracted periods to anticipate bad weather or bad road conditions as on pleasure and business cars and may also be used for trucks for protracted periods for bad weather and intermittent driving on sand, gravel or rough roads.

In short, the device is really a removable traction tread which may be used at all times without sacrificing smoothness of rideability.

I claim:

1. An anti-skid device for tires comprising a substantially circular and resilient cover adapted to fit over and hug the outside of the tire, the inner face of said cover lying flush with the tire treads, inwardly extending side walls along the opposite longitudinal edges of said cover adapted to lie flush with the adjacent side portions of the tires, said cover and side walls being cut transversely therethrough, a plurality of transverse, circumferentially spaced treads on the outside of said cover and side walls, a pair of three-sided brackets having substantially the same cross section as said cover and side walls, said cover and side walls at each end having a narrow, three-sided opening adapted to receive one of said brackets therewithin, a plurality of male elements at the outer end of one of said brackets, a plurality of female elements formed in the other of said brackets, a pair of circular cables within each of said side walls, the ends of said cables being secured to said brackets, said brackets at their outer portions having laterally aligned openings, said cover adjacent said bracket openings having openings aligned therewith, certain of said male elements having a plurality of longitudinally spaced openings, the corresponding female elements having an opening adapted to be aligned with said male element openings and releasable fastening means within said aligned openings.

2. An anti-skid device as set forth in claim 1, said corresponding female elements also having extensions adapted to lie flush with said male elements, and a pair of inwardly extending guide lugs on each side of said extensions.

3. An anti-skid device as set forth in claim 2, and a plurality of secondary transverse treads intermediate each pair of said first treads, the height of said secondary treads being greater than the height of said first treads.

4. An anti-skid device as set forth in claim 3, said cover intermediate said first treads being provided with a plurality of openings therethrough.

5. An anti-skid device as set forth in claim 4, including webbing connecting each of said secondary treads with the adjacent one of said first treads, said cover, side walls, first and second treads and webbing being integrally formed of rubber.

6. An anti-skid device as set forth in claim 3, the ground contacting surfaces of each of said treads being substantially concave.

7. An anti-skid device for tires as set forth in claim 2, including a substantially square-shaped spring, a chain connected to each corner of said spring, the other ends of each of said chains being connected to said cables.

References Cited in the file of this patent

UNITED STATES PATENTS

| | | |
|---|---|---|
| 953,673 | Weed | Mar. 29, 1910 |
| 1,801,159 | Hunter | Apr. 14, 1931 |
| 2,426,974 | Ragon | Sept. 2, 1947 |
| 2,608,232 | Kennedy | Aug. 26, 1952 |

FOREIGN PATENTS

| | | |
|---|---|---|
| 272,410 | Germany | Mar. 31, 1914 |
| 525,757 | Great Britain | Sept. 4, 1940 |